Figure 1:
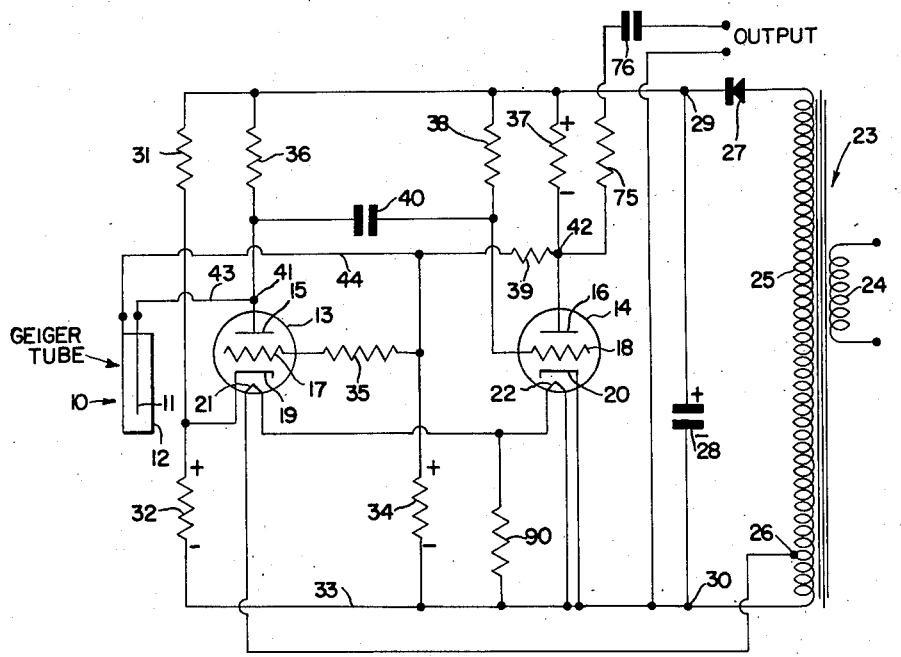

Jan. 10, 1961 W. B. HAMELINK 2,967,941
CONTROL APPARATUS
Filed April 17, 1958

INVENTOR.
WILLIAM B. HAMELINK
BY
ATTORNEY

United States Patent Office
2,967,941
Patented Jan. 10, 1961

2,967,941

CONTROL APPARATUS

William B. Hamelink, Minneapolis, Minn., assignor to Minneapolis-Honeywell Regulator Company, Minneapolis, Minn., a corporation of Delaware Filed Apr. 17, 1958, Ser. No. 729,170

11 Claims. (Cl. 250—83.6)

This invention is concerned with an improved control apparatus and more particularly with a control apparatus utilizing a Geiger-Muller tube and a multi-vibrator circuit connected in mutual controlling relationship.

The present invention is directed specifically to a control apparatus utilizing a non-self quenching Geiger tube, also known as a Geiger-Muller tube or a radiation counter. As is well known, this type of Geiger tube becomes ionized and conducts electrical current upon an ionizing event passing through the tube. This conducting state for the Geiger tube continues until some means is provided to quench or stop the conduction of current by the tube. Normally, this quenching is accomplished by a means which reduces the operating voltage of the tube, and thereby causes the tube to de-ionize. After de-ionization, the full operating voltage may again be applied to the Geiger tube and the tube becomes conductive only upon a further ionizing event passing through the tube.

Circuits for use with the non-self quenching Geiger tube for the most part have utilized a source of operating voltage for the Geiger tube and a further means controlled by the Geiger tube which in turn controls the operating voltage applied to the tube. This further means then provided for quenching of the Geiger tube.

It is an object of the present invention to provide an improved control apparatus utilizing a Geiger tube and a multi-vibrator network with the Geiger tube and the multi-vibrator network connected in mutual controlling relationship such that the operating voltage for the Geiger tube is derived due to the potential level existing in the multi-vibrator network while the multi-vibrator network is in its stable condition and wherein ionization of the Geiger tube causes the multi-vibrator network to be pulsed or triggered from its stable condition to its unstable condition, thereby altering the operating voltage applied to the Geiger tube and quenching the tube.

It is a further object of the present invention to provide an improved control apparatus utilizing a Geiger tube and a pair of controllable current conducting devices which are connected in multi-vibrator relationship and in which the anode and cathode of the Geiger tube are connected to electrodes of the current conducting devices such that when the multi-vibrator network is in its stable state, an operating voltage is applied to the Geiger tube, and such that upon the Geiger tube becoming ionized, the multi-vibrator is pulsed to its unstable state and the Geiger tube is quenched.

It is a further object of the present invention to provide an improved control apparatus utilizing a pair of discharge devices connected in multi-vibrator relationship and having a stable condition wherein a first of the discharge devices is conducting and the second device is non-conducting, and having a Geiger tube with the anode thereof connected to the anode of the non-conducting discharge device and the cathode thereof connected to the anode of the conducting discharge device, to thereby apply an operating voltage to the Geiger tube, and having further means connecting the Geiger tube in controlling relation to the multi-vibrator to cause the multi-vibrator to move from its stable to its unstable condition and thereby quench the Geiger tube.

As has been mentioned, a Geiger tube of the non-self quenching type assumes a condition of sustained discharge or conduction until the quenching means associated with the Geiger tube is effected to quench the tube. In many of the prior art devices, the operating voltage from the Geiger tube is derived from a source of voltage separate from the quenching means. It is therefore possible, under a condition of initial energization, for the Geiger tube to go into a condition of sustained discharge due to an ionizing event passing through the tube, and to be maintained in this condition of sustained discharge for a period of time while the quenching means was still in an inoperative condition. This is particularly true when the quenching means includes electron discharge devices having an inherent time delay while the filaments thereof heat the cathode to an operating temperature. This sustained discharge renders the Geiger tube unstable, at least for a considerable period of time.

It is an object of the present invention to provide an improved control apparatus having a Geiger tube and having a multi-vibrator network including a pair of electron discharge devices, with the Geiger tube connected to receive its operating voltage from the multi-vibrator network such that the operating voltage is not applied to the Geiger tube until the multi-vibrator is in an operating condition.

Figure 2:
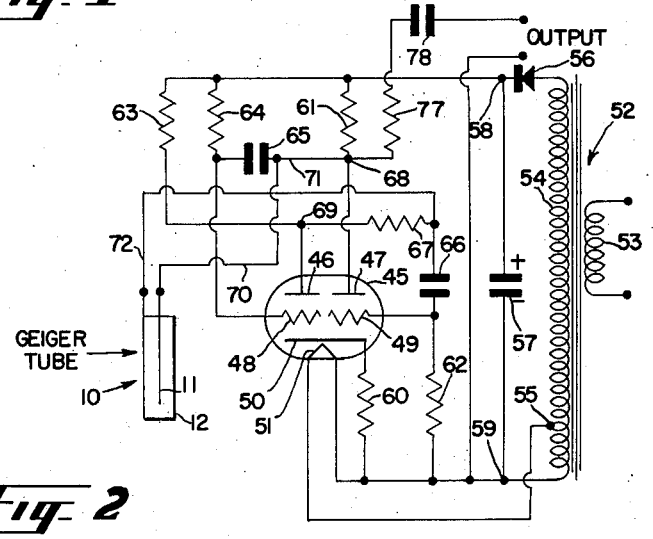

These and other objects of the invention will be apparent to those skilled in the art upon reference to the following specification, claims, and drawings, of which, Figure 1, is a schematic representation of a first modification of the present invention, and Figure 2, is a schematic representation of a second modification of the present invention.

Referring specifically to Figure 1, the reference numeral 10 designates a radiation counter in the form of a Geiger tube having an anode 11 and a cathode 12. As is well known, the anode and cathode of Geiger tube 10 are disposed in an ionizable gaseous medium and upon an operating voltage being applied to the anode and cathode, an electrical field is set up within the gaseous medium. Upon the Geiger tube being subjected to a source of radiation, such as a fire, the gas within the Geiger tube ionizes and a current flows between the electrodes of the tube. The particular Geiger tube disclosed in Figure 1 is of the non-self quenching type and this type of tube requires an external mechanism, commonly called a quenching circuit, to de-ionize the tube after each ionizing event. Geiger tube 10 further has an inherent background count, which means that Geiger tube 10 becomes ionized at random and infrequent intervals due to external sources of radiation. When the Geiger tube 10 is positioned for example to monitor the flame of a fuel burner unit, the Geiger tube experiences this infrequent and random background count when the fuel burner unit is in the standby or no-flame condition. However, when a flame is present at the fuel burner unit, the Geiger tube 10 experiences a sustained counting rate. When the apparatus of Figure 1 is used as a flame detector to monitor the flame at a fuel burner unit, means are provided to cause the apparatus to respond only to this sustained counting rate indicative of the presence of the flame and to be unresponsive to the background count of the Geiger tube.

The reference numerals 13 and 14 designate a pair of electronic valves in the form of triode electron discharge devices. Each of these devices have an anode designated as 15 and 16 respectively, a control electrode designated as 17 and 18 respectively, and a cathode designated as 19 and 20 respectively. In the modification of Figure 1, two independent discharge devices are utilized each having its own cathode and each having its own cathode heater designated as 21 and 22 respectively. As will be described, the modification of Figure 2 provides a dual triode in which each of the triode sections utilize a common cathode.

Operating voltage for the apparatus of Figure 1 is provided from a transformer 23 having a primary winding 24 connected to a source of alternating voltage, not shown. Transformer 23 is also provided with a tapped secondary winding 25. The lower portion of this secondary winding, which exists below the tap 26, provides energizing voltage for the heaters 21 and 22 of the triodes 13 and 14. The full voltage secondary winding 25 is utilized to provide operating direct current voltage for Geiger tube 10 as well as discharge devices 13 and 14. This operating voltage is derived by means of a rectifier 27 and a capacitor 28, the capacitor being charged to the polarity indicated in Figure 1. The terminal 29 can therefore be considered the positive output terminal of the source of direct current voltage and the terminal 30 can be considered the negative terminal of this source of voltage.

Resistors 31 and 32 form a bleeder network connected to terminals 29 and 30 and a voltage of the polarity indicated in Figure 1 is therefore present across resistor 32. This voltage across resistor 32 biases discharge device 13 to be normally non-conductive. This can be seen by tracing a circuit from the cathode 19 through resistor 32, a conductor 33, a resistor 34, and a resistor 35 to control electrode 17.

Operating voltage for the anode 15 of discharge device 13 is derived through a plate load impedance in the form of resistor 36, which resistor connects anode 15 to the positive terminal 29 of the voltage source.

The anode 16 of discharge device 14 is likewise connected to the positive terminal 29 through a plate load impedance in the form of resistor 37. The cathode 20 of this discharge device is connected to the negative terminal 30 of the voltage source and the control electrode 18 is connected to the positive terminal 29 through a further impedance in the form of resistor 38. This last mentioned connection connects the control electrode 18 to a positive source of voltage and causes discharge device 14 to be biased normally to a conducting state.

The discharge devices 13 and 14 are connected in multi-vibrator relationship and this multi-vibrator type connection is completed by means of a pair of coupling impedances which place the discharge devices 13 and 14 in mutual controlling relationship. The control electrode 17 of discharge device 13 is connected to the output or anode 16 of discharge device 14 through a coupling impedance including resistor 35 and a resistor 39. The control electrode 18 of discharge device 14 is connected to the output or anode 15 of discharge device 13 through a further coupling impedance in the form of a capacitor 40. Therefore, discharge devices 13 and 14 are connected in a multi-vibrator network having a stable condition wherein discharge device 13 is normally non-conductive and discharge device 14 is normally conductive.

With the discharge devices 13 and 14 in their normal state of conduction, the terminal labeled 41, associated with the anode 15 of discharge device 13 is at substantially the same potential level as the positive output terminal 29 of the voltage source. The terminal designated 42, associated with the anode 16 of discharge device 14, is at a potential level somewhat lower than the positive terminal 29 of the source, this lower potential level being determined by the voltage drop across the resistor 37 due to the conduction of discharge device 14. Therefore, it can be seen that terminal 41 is positive with respect to terminal 42. This differential in operating voltage or potential difference between terminals 41 and 42 is utilized as the operating voltage for Geiger tube 10. The anode 11 of Geiger tube 10 is connected to the positive terminal 41 by means of conductor 43 whereas the cathode 12 is connected by means of conductor 44 and resistor 39 to the negative terminal 42.

Considering now the initial energization of the apparatus of Figure 1, that is considering the initial application of alternating voltage to the primary 24 of transformer 23, the cathodes 19 and 20 of discharge device 13 and 14 are initially in a cold condition. Therefore, both of the discharge devices are in a non-conducting state and the terminals 41 and 42 to which the electrodes of Geiger tube 10 are connected remain at approximately the same potential level. Therefore, an operating voltage is not at this time applied to Geiger tube 10. The Geiger tube 10 is thereby prevented from becoming ionized even though an ionizing event may pass through the Geiger tube. Cathode heaters 21 and 22 of the discharge devices 13 and 14 are now energized from the lower portion of the secondary winding 25. These heaters are connected in series, with the heater 22 having a resistor 90 connected in parallel therewith. It is apparent that cathode 19 of discharge device 13 is heated to its operating temperature before cathode 20 of discharge device 14 reaches its operating temperature. Therefore, upon initial energization of the apparatus of the Figure 1, the cathode of discharge device 13 is heated to an operating temperature before the cathode of discharge device 14. This construction insures that an operating voltage is not applied to Geiger tube 10 until discharge device 13 is in operating condition where it is capable of sensing ionization of the Geiger tube to thereby trigger the multi-vibrator network and subsequently quench the Geiger tube. As the cathodes 19 and 20 of the discharge device become heated to an operating temperature, the multi-vibrator network including these two discharge devices assumes its normal state, that is, discharge device 13 remains nonconductive and discharge device 14 becomes conductive. An operating voltage is then applied to the electrodes of Geiger tube 10 and Geiger tube 10 is then sensitive not only to the inherent background count but also to any given condition to be monitored, for example the presence of a fire.

Consider now the condition wherein Geiger tube 10 becomes ionized. Ionization of this Geiger tube causes a pulse of current to flow. The action of Geiger tube 10 once it is conductive, can be explained in at least two ways. The end result of each of these explanations is that the discharge device 13 is rendered conductive. One of the explanations is that Geiger tube 10, when conductive, connects the control electrode 17 through resistor 35 to the anode 15 of discharge device 13 thereby rendering this discharge device conductive. A second of the explanations is that a pulse of current flows which can be traced from the positive terminal 29 of the voltage source through resistor 36, conductor 43, Geiger tube 10, conductor 44, and resistor 34 to the negative terminal of the voltage source. This last traced current flow circuit produces a voltage across resistor 34 which opposes the biasing voltage present across resistor 32 and thereby renders discharge device 13 conductive.

As has been stated, that either explanation suffices, and the desired end result is that discharge device 13 becomes conductive. Upon discharge device 13 becoming conductive, a current flows from the cathode to the anode of this discharge device and a voltage is produced across resistor 36 such that the potential of the lower terminal of this resistor (terminal 41) moves in a negative direction. This negative voltage is then applied to the control electrode 18 of discharge device 14 through capacitor 40 and causes the normally conducting discharge device 14 to become non-conductive.

When the discharge device 14 becomes non-conductive, the potential level of the lower terminal of its plate resistor 37 (terminal 42) moves in a positive direction. This positive pulse of voltage is applied to the control electrode 17 of discharge device 13 through resistors 39 and 35, thereby causing discharge device 13 to become more conductive. This in turn causes discharge device 14 to become more non-conductive.

Therefore, the ionization of Geiger tube 10 causes the multi-vibrator network including discharge devices 13 and 14 to move from the stable condition to an unstable condition wherein discharge device 13 is conductive and discharge device 14 is non-conductive.

Considering the operation of the apparatus in this unstable condition, it will be immediately recognized that the potential level of terminal 41 is now negative with respect to terminal 42. Therefore, Geiger tube 10 now has a negative voltage applied to anode 11 and a positive voltage applied to cathode 12. This effectively quenches Geiger tube 10. This above described condition wherein discharge device 13 is conducting and discharge 14 is non-conducting is the unstable condition of the apparatus and this unstable condition is maintained only so long as there are changing voltage conditions controlling the control electrodes of the two discharge devices. For example, once the voltage present across resistor 36 has reached a stable condition, a negative voltage is no longer supplied to the control electrode 18 of discharge device 14 through the coupling capacitor 40. The discharge device 14 then once again starts to move to its stable and conducting condition, this being due to the circuit completed through resistor 38 which connects the control electrode 18 to the positive terminal 29 of the voltage source.

As discharge device 14 again becomes conductive, the potential level of the lower terminal of resistor 37 moves in a negative direction, this applying a negative voltage to the control electrode 17 of discharge device 13 through a circuit including resistors 39 and 35. Discharge device 13 then becomes less conductive and the potential level of the lower terminal of resistor 36 moves in a negative direction. This negative voltage is then applied through the coupling capacitor 40 to the control electrode 18 of discharge device 14 causing this discharge device to become more conductive. This above described effect continues until the multi-vibrator, including discharge devices 13 and 14, is once again at its stable condition wherein discharge device 13 is non-conductive and discharge device 14 is conductive. Once again, Geiger tube 10 has a positive voltage applied to the anode 11 and a negative voltage applied to the cathode 12, thereby rendering the Geiger tube 10 sensitive to a further ionizing event.

From the above it can be seen that I have provided an improved control apparatus wherein Geiger tube 10 derives its operating voltage from the main electrodes of controllable current conducting devices 13 and 14, and wherein these devices are connected in multi-vibrator relationship, which multi-vibrator is controlled by Geiger tube 10 and which multi-vibrator is effected to quench Geiger tube 10. Furthermore, such a construction provides a means for preventing the application of operating voltage to Geiger tube 10 until its quenching means, in the form of a multi-vibrator network, is in an operating condition.

It will be remembered from the above explanation that the stable condition of the multi-vibrator of Figure 1 is such that discharge device 13 is non-conducting and discharge device 14 is conducting. Furthermore, it is necessary in order to quench Geiger tube 10 for the multi-vibrator to be pulsed to its unstable condition. This is achieved by connecting Geiger tube 10 in controlling relation to discharge device 13. Consider now a malfunction wherein the discharge device 13 is rendered inoperative, such as for example the open circuiting of the heater 21 of this discharge device. The apparatus of Figure 1 is now unable to quench Geiger tube 10 since the discharge device 13 is unable to move to its conducting state in response to a signal from Geiger tube 10. Also, consider the malfunction wherein through cathode deterioration, the discharge device 13 conducts appreciably less current when in its conducting state than does discharge device 14 when in its conducting state. In this case, discharge device 13 may still be sensitive to the output of Geiger tube 10, but due to the low current conducting capabilities of this discharge device, the operating voltage applied to Geiger tube 10 is not altered sufficiently to quench the tube. These above mentioned malfunctions can be cured by the use of a modification of the present invention disclosed in Figure 2.

Referring now specifically to Figure 2, the electronic valve utilized in this modification consists of a dual triode 45 having anodes 46 and 47 as well as control electrodes 48 and 49. The dual triodes utilize a single cathode 50 having a heater 51. As will be readily apparent, the construction of Figure 2 insures that Geiger tube 10 will not have an operating voltage applied thereto in the event that the discharge device 45 is rendered inoperative, such as by the cathode 50 losing its electron emitting properties, or by cathode heater 51 open circuiting.

Operating voltage for the apparatus of Figure 2 is derived from a transformer 52 having a primary winding 53 connected to a source of alternating voltage, not shown, and having a tapped secondary winding 54. The portion of secondary winding 54 lying below the tap 55 provides energizing voltage for the cathode heater 51 of discharge device 45. The direct current operating voltage for the apparatus of Figure 2 is derived from secondary winding 54 by means of a rectifier 56 and a capacitor 57, which capacitor is charged to the polarity indicated in Figure 2. The terminal identified by the reference numeral 58 is therefore the positive terminal of this source of voltage and the terminal identified by the numeral 59 is the negative terminal of this source of voltage. The common cathode 50 of the dual triode 45 is connected to the negative terminal 59 through a resistor 60. The triode including anode 47 and control electrode 49 corresponds to the discharge device 13 of Figure 1 since this triode is normally in a non-conducting state. The anode 47 is connected to the positive terminal 58 through a plate load resistor 61. The control electrode 49 of this triode is connected to the negative terminal 59 through a resistor 62.

The triode consisting of anode 46 and control electrode 48 corresponds to the discharge device 14 of Figure 1 since this triode is normally in a conducting state. The anode 46 is connected through a plate load resistor 63 to the positive terminal 58 and the control electrode 48 is also connected through a resistor 64 to this positive terminal 58. Therefore, the triode including cathode 50, control electrode 48 and anode 46 is normally in a conducting state, thereby causing a voltage to exist across the cathode resistor 60. This voltage is of such a polarity as to cause the lower terminal thereof to be negative. The voltage developed across cathode resistor 60 is applied to the control electrode 49 through resistor 62 and biases the triode including cathode 50, control electrode 49 and anode 47 to be non-conductive.

The triodes of discharge device 45 are connected in mutual controlling relationship. The control electrode 48 is connected through a coupling impedance in the form of capacitor 65 to the anode 47. The control electrode 49 is connected through a coupling impedance in the form of capacitor 66 and resistor 67 to the anode 46. Therefore, the two triodes are connected in multi-vibrator relationship having a stable condition wherein the triode 50, 48, 46 is conductive and the triode 50, 49, 47 is non-conductive.

In the stable state, the terminal labelled 68 is at approximately the same potential level as the positive output terminal 58 of the voltage source, since there is substantially no voltage drop across the plate load resistor 61. Furthermore, the terminal labelled 69 is at a potential level which is negative with respect to the potential of terminal 58 of the voltage source, this being due to the voltage drop across the plate load resistor 63. The anode 11 of Geiger tube 10 is connected by means of conductors 70 and 71 to terminal 68 and the cathode 12 of Geiger tube 10 is connected by means of conductor 72 and resistor 67 to the terminal 69. Therefore, so long as the multivibrator network of Figure 2 is in the stable state, an operating voltage is applied to the electrodes of Geiger tube 10.

From the above explanation, it can be seen that the terminals 68 and 69 of Figure 2 correspond to the terminals 41 and 42 of Figure 1.

The operation of the apparatus of Figure 2 is much the same as the operation of the apparatus of Figure 1. Upon an ionizing event passing through Geiger tube 10, a positive pulse is applied to control electrode 49 to cause the triode 50, 49, 47 to become conductive. This causes the lower terminal of resistor 61, that is terminal 68, to move in a negative direction, thereby applying a negative voltage to control electrode 48. This negative voltage causes triode 50, 48, 46 to be rendered non-conductive, which in turn causes the potential level of the lower terminal of the resistor 63, that is terminal 69 to move in a positive direction. This action applies a negative voltage to the anode of Geiger tube 10 and applies a positive voltage to the cathode thereof.

The apparatus of Figures 1 and 2 can be utilized to perform a variety of control functions. For purposes of simplicity, the output of the apparatus of Figures 1 and 2 has been simply labelled as "output" and can be connected in a variety of manners well known in the art. The output of the apparatus of Figure 1 is taken between terminal 42 and the negative terminal 30 of the voltage source, a series connected resistor 75 and capacitor 76 being connected therein. The output of the apparatus of Figure 2 is taken from terminal 68 to the negative terminal 59 of the voltage source, and in this modification a resistor 77 and a capacitor 78 are also connected in series therein.

Other modifications of the present invention will be apparent to those skilled in the art and it is intended that the scope of the present invention be limited solely by the scope of the appended claims.

I claim as my invention:

1. In combination, a non-selfquenching radiation counter having an anode and a cathode, and an ionizing medium therebetween, a pair of electronic valves each having a pair of main current conducting electrodes and a control electrode, circuit means interconnecting said pair of electronic valves in multi-vibrator relationship such that one of said valves is normally in a conducting state and the other of said valves is normally in a non-conducting state, circuit means connecting the anode of said radiation counter to a main current conducting electrode of one of said electronic valves, circuit means connecting the cathode of said radiation counter to a main current conducting electrode of said other electronic valves, to thereby apply an operating voltage to said radiation counter, circuit means connecting said radiation counter in controlling relation to the control electrode of one of said electronic valves to cause said multi-vibrator to operate upon said radiation counter becoming ionized, said electronic valves thereby being rendered effective to quench said radiation counter.

2. Control apparatus comprising; a non-selfquenching radiation counter having an anode and a cathode, and an ionizable gaseous medium between said anode and cathode, a multivibrator network having a pair of controllable current conducting devices each having a main current conducting electrode, one of said current conducting devices being normally conductive and the other being normally non-conductive; circuit means connecting the anode and cathode of said radiation counter to the main electrodes and said current conducting devices to apply an operating voltage to said radiation counter, said operating voltage being established due to the operating differential in voltage of the main current conducting electrodes of said current conducting devices when in said normal state of conduction, circuit means connecting said radiation counter in controlling relation to one of said current conducting devices to thereby control said multi-vibrator upon said radiation counter becoming ionized, said multi-vibrator thereby assuming a condition of operation wherein said one current conducting device is rendered non-conductive and said other current conducting device is rendered conductive, to thereby alter the voltage applied to said radiation counter and quench said radiation counter.

3. Control apparatus comprising; a first and second electron discharge device each having an anode, a cathode and a control electrode, circuit means interconnecting said first and second electron discharge devies in a multivibrator circuit such that said first discharge device is rendered normally conductive and said second discharge device is rendered normally non-conductive; a non-selfquenching radiation counter tube having an anode and a cathode, circuit means connecting the anode of said counter tube to the anode of said second discharge device, further circuit means connecting the cathode of said radiation counter to the anode of said first discharge device, to thereby apply an operating voltage to said radiation counter, the magnitude and polarity of said operating voltage being determined by the difference in potential level of the anode of said first and second discharge devices; and further means connecting said radiation counter in controlling relation to the control electrode of one of said discharge devices to thereby cause said first discharge device to become non-conductive and said second discharge device to become conductive upon said radiation counter being exposed to an ionizing condition, said multi-vibrator circuit thereby functioning to change the voltage applied to said radiation counter and thereby quench said radiation counter.

4. Condition responsive apparatus comprising; condition sensing means of the non-selfquenching type having an anode and a cathode disposed in an ionizable gaseous medium; a quench circuit for said sensing means having a pair of controllable current conducting devices connected in a multi-vibrator circuit, each of said current conducting devices having a main current path electrode and a control electrode; circuit means connecting said condition sensing means with the anode of said sensing means being connected to the main electrode of one of said current conducting devices and the cathode of said sensing means being connected to the main electrode of the other current conducting device, the normal state of operation of said quench circuit being such as to provide a source of operating voltage for said sensing means across the said main current path electrodes; and further means connecting said sensing means in controlling relationship to the control electrode of one of said current conducting devices to cause said quench circuit to assume a second condition of operation wherein the operating voltage on said sensing means is varied to quench said sensing means.

5. Control apparatus comprising; a non-selfquenching Geiger tube having an anode and a cathode, a first and a second electron discharge device each having an anode, a cathode and a control electrode, circuit means interconnecting said first and second electron discharge devices in multi-vibrator relationship having a stable condition wherein one of said discharge devices is conductive and the other of said discharge devices is non-conductive, means connecting the anode of said Geiger tube to the anode of said other electron discharge device, means connecting the cathode of said Geiger tube to the anode of said one discharge device, to thereby apply an operating voltage to said Geiger tube as determined by the potential differential of the anodes of said other and said one discharge device, and further circuit means connecting said Geiger tube in controlling relation to the control electrode of one of said discharge devices in a manner to cause said multi-vibrator to be pulsed from said stable to an unstable condition wherein said one discharge device is rendered non-conductive and said other discharge device is rendered conductive, to thereby alter the operating voltage applied to said Geiger tube and quench said Geiger tube.

6. Control apparatus comprising; a non-self quenching Geiger tube having an anode and a cathode, a first and a second electron discharge device, each discharge device having an anode, circuit means interconnecting said first and second discharge devices in multi-vibrator relationship having a stable condition wherein one of said discharge devices is conductive and the other of said discharge devices is non-conductive, circuit means connecting the anode of said Geiger tube to the anode of said non-conductive discharge device, circuit means connecting the cathode of said Geiger tube to the anode of said conductive discharge device, to thereby apply an operating voltage to said Geiger tube, said operating voltage being determined by the differential in voltage between the anodes of said other and said one discharge device, and further circuit means connecting said Geiger tube in controlling relation to one of said discharge devices to cause said multi-vibrator to be pulsed from said stable to an unstable condition wherein said other discharge device is rendered conductive and said one discharge device is rendered non-conductive, to thereby vary the voltage applied to said Geiger tube and to quench said Geiger tube.

7. Control apparatus comprising; a non-self quenching Geiger tube having an anode and a cathode, a first and a second electron discharge device each having an anode, a control electrode and a cathode, circuit means interconnecting the anodes, control electrodes and cathodes of said first and second electron discharge devices in a multi-vibrator network having a stable condition wherein one of said discharge devices is conductive and the other of said discharge devices is non-conductive, means connecting the cathode of said Geiger tube to the anode of said one discharge device, means connecting the anode of said Geiger tube to the anode of said other discharge device, to thereby apply an operating voltage to said Geiger tube, means connecting said Geiger tube in controlling relationship to the control electrode of said other discharge device to thereby trigger said multi-vibrator network from said stable condition to an unstable condition wherein said one discharge device is rendered non-conductive and said other discharge device is rendered conductive.

8. Control apparatus comprising; a non-self quenching Geiger tube having an anode and a cathode, a first and a second electron discharge device each having an anode, a control electrode, a cathode and a cathode heater; circuit means connecting the anodes, control electrodes, and cathodes of said first and second electron discharge devices in a multi-vibrator network having a stable condition wherein one of said discharge devices is conductive and the other of said discharge devices is non-conductive; means connecting the cathode of said Geiger tube to the anode of said one discharge device, means connecting the anode of the said Geiger tube to the anode of the said other discharge device, to thereby apply an operating voltage to said Geiger tube; further circuit means connecting said Geiger tube in controlling relationship to the control electrode of said other discharge device to thereby trigger said multi-vibrator network from said stable condition to an unstable condition wherein said one discharge device is rendered non-conductive and said other discharge device is rendered conductive, and energizing circuit means for the cathode heaters of said first and second discharge devices, said last named circuit means being constructed and arranged such that the cathode of the said other discharge device is heated to an operating temperature before the cathode of said one discharge device is heated to an operating temperature, to thereby insure that an operating voltage is not applied to said Geiger tube until said other discharge device is in an operating condition.

9. Control apparatus comprising; a first and second electron discharge device each having an anode, a cathode, a control electrode, and a cathode heater; circuit means interconnecting said first and second electron discharge devices in a multi-vibrator circuit such that said first discharge device is rendered normally conductive and said second discharge device is rendered normally non-conductive; a non-self quenching radiation counter tube having an anode and a cathode, circuit means connecting the anode of said radiation counter to the anode of said second discharge device, further circuit means connecting the cathode of said radiation counter to the anode of said first discharge device, to thereby apply an operating voltage to said radiation counter, the magnitude and polarity of said operating voltage being determined by the difference of potential level of the anode of said first and second discharge devices; further means connecting said radiation counter in controlling relation to the control electrode of one of said discharge devices to thereby cause said first discharge device to become non-conductive and said second discharge device to become conductive upon said radiation counter being exposed to an ionizing condition, said multi-vibrator circuit thereby functioning to change the voltage applied to said radiation counter and thereby quench said radiation counter, and energizing circuit means for the cathode heaters of said first and second electron discharge devices constructed and arranged to cause the cathode of said second discharge device to be heated to an operating temperature prior to the cathode of said first discharge device being heated to an operating temperature.

10. Control apparatus comprising; a source of direct current voltage having a positive terminal and a negative terminal, a first and a second electron discharge device, each having an anode, a control electrode and a cathode, a voltage divider connected across the terminals of said source of voltage, means connecting the cathode of said first discharge device to an intermediate point on said voltage divider to bias said first discharge device to be normally non-conductive, means connecting the anode of said first discharge device through a load impedance to the positive terminal of said source of voltage, means connecting the cathode of said second discharge device to the negative terminal of said source of voltage, means connecting the anode of second discharge device through a load impedance to the positive terminal of said source of voltage, means connecting the control electrode of said second discharge device through an impedance to the positive terminal of said source of voltage to bias said second discharge device to be normally conductive, circuit means including coupling impedance means connecting the control electrode of said first discharge device to the anode of said second discharge device and the control electrode of said second discharge device to the anode of the said first discharge device, such that said first and second discharge devices are connected in a multi-vibrator circuit having a stable condition wherein said first discharge device is normally non-conducting and said second discharge device is normally conducting, a non-selfquenching Geiger tube having an anode and a cathode, circuit means connecting the anode of said Geiger tube to the anode of said first discharge device, and circuit means connecting the cathode of said Geiger tube to the control electrode of said first discharge device and to the anode of said second discharge device, to thereby apply an operating voltage to said Geiger tube and to connect said Geiger tube in controlling relation to the control electrode of said first discharge device.

11. Control apparatus comprising; a source of direct current voltage having a positive and a negative terminal, first and second discharge devices each having an anode and a control electrode and having a common cathode, circuit means connecting said common cathode through cathode impedance means to the negative terminal of said source of voltage, circuit means connecting the anode of said first discharge device through a load impedance to the positive terminal of said source of voltage, circuit means connecting the control electrode of said first discharge device to the negative terminal of said source of voltage to bias said first discharge device to be normally non-conductive, circuit means connecting the anode of said second discharge device through a load impedance means to the positive terminal of said source of voltage, circuit means connecting the control electrode of said second discharge device through an impedance means to the positive terminal of said source of voltage to bias said second discharge device to be normally conductive, circuit means including a coupling impedance connecting the control electrode of said first discharge device to the anode of said second discharge device, circuit means including further coupling means connecting the control electrode of said second discharge device to the anode of said first discharge device, thereby placing said first and second discharge devices in multi-vibrator relationship having a stable condition wherein said first discharge device is normally non-conductive and said second discharge device is normally conductive, a non-selfquenching Geiger tube having an anode and a cathode, circuit means connecting the anode to said Geiger tube to the anode of said first discharge device, and circuit means connecting the cathode of said Geiger tube to the control electrode of first discharge device and to the anode of said second discharge device such that said Geiger tube is connected in controlling relation to said multi-vibrator circuit and derives its operating voltage therefrom.

References Cited in the file of this patent

UNITED STATES PATENTS

| | | |
|---|---|---|
| 2,675,484 | Hepp | Apr. 13, 1954 |
| 2,752,508 | Zito | June 26, 1956 |
| 2,754,056 | Friedman | July 10, 1956 |
| 2,824,973 | Gundlach | Feb. 25, 1958 |
| 2,866,100 | Leaver | Dec. 23, 1958 |
| 2,883,551 | Zito | Apr. 21, 1959 |

FOREIGN PATENTS

| | | |
|---|---|---|
| 484,536 | Canada | July 1, 1952 |

OTHER REFERENCES

Korff: "Electron and Nuclear Counters," D. Van Nostrand Co. Inc., pages 158–163 (1948).